United States Patent
Hood

(10) Patent No.: US 9,644,060 B2
(45) Date of Patent: May 9, 2017

(54) HYDROPHOBIC CROSSLINKABLE ACETOACETYLATED LACTAM/VINYL ALCOHOL COPOLYMERS

(71) Applicant: David K. Hood, Basking Ridge, NJ (US)

(72) Inventor: David K. Hood, Basking Ridge, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

(21) Appl. No.: 14/848,927

(22) Filed: Sep. 9, 2015

(65) Prior Publication Data

US 2015/0376319 A1 Dec. 31, 2015

Related U.S. Application Data

(63) Continuation of application No. 12/244,420, filed on Oct. 2, 2008, now abandoned.

(60) Provisional application No. 60/977,422, filed on Oct. 4, 2007.

(51) Int. Cl.

| C08F 226/10 | (2006.01) |
| C08F 216/06 | (2006.01) |
| C08F 26/06 | (2006.01) |
| C08F 26/10 | (2006.01) |
| B41M 5/52 | (2006.01) |

(52) U.S. Cl.
CPC ......... *C08F 226/10* (2013.01); *B41M 5/5254* (2013.01); *C08F 26/06* (2013.01); *C08F 26/10* (2013.01); *C08F 216/06* (2013.01)

(58) Field of Classification Search
CPC ....... B41M 5/5254; C08F 26/06; C08F 26/10; C08F 226/10; C08F 216/06
See application file for complete search history.

(56) References Cited

U.S. PATENT DOCUMENTS

| 2,536,980 A | 1/1951 | Jones |
| 2,667,473 A | 1/1954 | Morner et al. |
| 3,345,198 A | 10/1967 | Pfeiffer et al. |
| 4,350,788 A | 9/1982 | Shimokawa et al. |
| 4,647,951 A | 3/1987 | Yamori et al. |
| 5,227,423 A | 7/1993 | Ingle |
| 6,933,024 B2 | 8/2005 | Chen |
| 2006/0033993 A1 | 2/2006 | Sugino et al. |

FOREIGN PATENT DOCUMENTS

| JP | 2005010760 | 1/2005 |
| WO | WO 2004/056897 | 7/2004 |

OTHER PUBLICATIONS

"Acetoacetoxyethyl Methacrylate (AAEM) Acetoacetyl Chemistry," by Eastman Chemical Company (Dec. 1999).
Gould, M.L. et al., "Novel Self-Initating UV-Curable Resins: Generation Three," RadTech Europe 2005 Conference & Exhibition.
Pich, A. et al., "Temperature-Sensitive Hybrid Microgels with Magnetic Properties," *Langmuir*, 20, pp. 10706-10711 (2004).
Clemens, R.J., "Diketene," *Chemical Reviews*, vol. 86, No. 2 (Apr. 1986).
Boese, Jr., "Diketene—A New Industrial Chemical," *Industrial and Engineering Chemistry*, vol. 32, No. 1, pp. 16-22, Jan. 1940.
PVP/VA Vinylpyrrolidone/Vinyl Acetate Copolymers, by Ashland, 2014, 4 pages.

*Primary Examiner* — Jeffrey Mullis
(74) *Attorney, Agent, or Firm* — Thompson Hine LLP; William J. Davis

(57) ABSTRACT

This invention relates to lactam/vinyl alcohol copolymers, and more specifically, to hydrophobic cross-linkable acetoacetylated lactam/vinyl alcohol copolymers suitable for use in a variety of applications including printing, inks, membranes, coatings, adhesives, oil treatment chemicals (such as gas and kinetic hydrate inhibitors), and fiber/textile treatments.

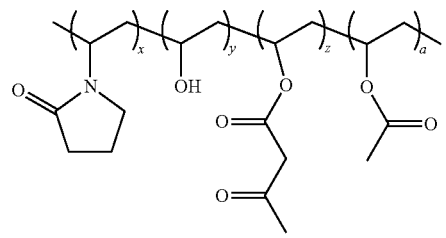

5 Claims, No Drawings

HYDROPHOBIC CROSSLINKABLE ACETOACETYLATED LACTAM/VINYL ALCOHOL COPOLYMERS

FIELD OF THE INVENTION

This invention relates to lactam/vinyl alcohol copolymers, and more specifically, to hydrophobic cross-linkable acetoacetylated lactam/vinyl alcohol copolymers suitable for use in a variety of applications including printing, inks, membranes, coatings, adhesives, oil treatment chemicals (such as gas and kinetic hydrate inhibitors), and fiber/textile treatments.

BACKGROUND OF THE INVENTION

Inkjet printers, i.e., printers which form an image by firing a plurality of discrete drops of ink from one or more nozzles on to the surface of a recording sheet placed adjacent the nozzles, have recently enjoyed a large increase in sales. Modern inkjet printers can print on almost any conventional paper or similar medium. The quality of images produced by such printers is greatly affected by the properties of the medium used. More particularly, to produce high quality images reliably, it is necessary that the recording medium, i.e., the inkjet recording sheet, dry rapidly, not promote excessive spreading of the ink droplet, not promote "wicking", that is spreading of ink by capillary action through fibrous medium such as paper, and, importantly, be such that the contrast of the dried image with moist surfaces does not result in bleeding of ink from the image.

In U.S. Pat. No. 6,933,024, T. Chen describes the use and preparation of poly(vinylpyrrolidone-(PVP) co-vinylalcohol) as an inkjet recording material by hydrolyzing PVP/polyvinylacetate copolymer. However, the resultant hydrolyzed product was not hydrophobic, i.e., water resistant.

In U.S. Pat. No. 4,350,788, W. Shinokawa et al. describes a synthetic resin emulsion containing an acetoacetylated polyvinyl alcohol as a protective colloid for use as an adhesive, paper treating agent, paint, fiber and textile treating agent and cement modifier. However, such a product would not be practical as an inkjet medium.

In U.S. Pat. No. 2,536,980, G. Jones describes synthetic polyvinyl alcohol-1-butene-1,3-dione reaction products and processes. However, the patent does not disclose applicant's hydrophobic, cross-linkable acetoacetylated lactam/vinyl alcohol copolymers.

Accordingly, it is an object of this invention to provide an improved inkjet recording medium. Another object herein is to provide a hydrophobic crosslinkable acetoacetylated lactam/vinyl alcohol copolymer.

Still another object of this invention is to provide a copolymer which is made by partially hydrolyzing a polyvinylpyrrolidone/vinyl acetate copolymer to produce a poly(vinylpyrrolidone/vinyl alcohol) copolymer and then acetoacetylating the copolymer with a diketene to obtain said desired copolymer.

These and other objects and features of the invention will be made apparent from the following description.

SUMMARY OF THE INVENTION

Described herein is a hydrophobic, crosslinkable acetoacetylated lactam/vinyl alcohol copolymer suitable for use as a moisture resistant inkjet recording medium. Preferably, the lactam in the copolymer is vinyl pyrrolidone or vinyl caprolactam.

The copolymer herein is made by partially hydrolyzing a polyvinylpyrrolidone/vinyl acetate copolymer to produce a poly(vinylpyrrolidone/vinyl alcohol) copolymer and then acetoacetylating this copolymer with a diketene to obtain the said desired copolymer.

A particular feature of the inkjet recording material herein is its enhanced dye fade stability.

Preferably, the polyvinylpyrrolidone/vinyl acetate is partially hydrolyzed to a degree of at least 80%; and the acetoacetylation step is carried out in a non-aqueous medium, suitably to a degree of at least 50%.

DETAILED DESCRIPTION OF THE INVENTION

The hydrophobic crosslinkable acetoacetylated lactam/vinyl alcohol copolymers of the invention is made from a poly(vinyllactam-co-vinyl ester), particularly poly(vinylpyrrolidone-co-vinyl acetate) copolymer, which is available from International Specialty Products (ISP) as a 70-30 copolymer (E-735) or as a 50-50 copolymer (E-535) (PVP-VAc). This copolymer then is hydrolyzed in the presence of a strong base, e.g., alcohol and water. The maximum equivalent of base (e.g., NaOH) suitably is equal to or less than the equivalent amount in the PVP/polyvinyl ester. The product is PVP/PVA (alcohol).

After hydrolysis, the vinyl alcohol containing copolymer can be acetoacetylated, e.g., by reaction with a diketene. This reaction is carried out in a non-aqueous medium such as acetic acid, dimethylformamide or dioxane. The diketene, in the form of a gas or liquid, can be directly brought into contact with the PVP/PVA powder. Alternatively, the vinyl alcohol containing copolymer can be acetoacetylated by the ester-interchange of polyvinyl alcohol with acetoacetate.

Example 1

Synthesis of PVP/PVA (70/30) Copolymer (P-1)

The invention will now be described by reference to the following examples in which PVP/PVA copolymer can be obtained by hydrolyzing PVP/PVAc (E-735) (70% PVP, 30% PVAc) with NaOH (1:1) in a water/alcohol mixture. The specific amounts of these components are given below in Table 1 below.

TABLE 1

| Hydrolysis of PVP/PVAc (E-735) (ISP) | | |
|---|---|---|
| | Wt. (g) | Eg. (PVAc) |
| PVP/PVAc E-735 (50% in ethanol) | 100 | 0.178 |
| NaOH (30% in water) | 23.7 | 0.178 |
| Deionized water | 100 | |

The initial pH of the PVP/PVAc reactant is 5.18 before the base is added, and 13.6 after the base is added. The hydrolysis reaction is conducted at 50-65° C. for approximately 3 hours. The final pH of the reaction mixture is 8.7. The resultant solution is then neutralized with 5% acetic acid to a pH of 7.0.

Example 2

Synthesis of PVP/PVA (50/50) Copolymer (P-2)

PVP/PVA copolymer (P-2) is obtained by hydrolyzing PVP/PVAc (E-535) (50% PVP, 50% PVAc). The reaction conditions can be the same as described for hydrolysis of E-735 in Example 1. The copolymer does not precipitate when 30 ml water is added. Then 47 grams of 30% NaOH is added over 5 minutes. The pH drops from 13.0 to 9.5. Then the remaining NaOH is added. The resultant pH is 12.2. Then 3 M HCl is added to bring down the pH to 7.2. The color of the solution changes from light brown to pale yellowish. The solution is stirred at 65-70° C. to remove ethanol. The specific amounts of the components are given in Table 2.

TABLE 2

Hydrolysis of PVP/PVAc E-535 (ISP)

|  | Wt. (g) | Eg. (PVAc) |
|---|---|---|
| PVP/PVAc E-535 (50% in ethanol) | 152 | 0.44 |
| NaOH (30% in water) | 59 | 0.44 |
| Deionized water | 30 (after all NaOH added) | |

Example 3

Synthesis of PVP/PVA (30/70) Copolymer (P-3)

PVP/PVA copolymer is obtained by hydrolyzing PVP/PVAc (E-335) (30% PVP, 70% PVAC). The reaction conditions can be the same as for the synthesis of P-1 and P-2. The specific amounts of the components are given below in Table 3 below. The solution stays clear when 37 g of water are added to the warm E-335 solution in 50% ethanol. Then 30 of 30% NaOH is added over 5 minutes. The pH dropped from 12.5 to 7.7 after one hour. Then an additional 6 g of 30% NaOH is added. The pH drops slowly to 11.0. The reaction is stopped with HCl to a pH of 7.0. The solution is cooled to room temperature.

TABLE 3

Hydrolysis of PVP/PVAc E-335 (by ISP)

|  | Wt. (g) | Eg. (PVAc) |
|---|---|---|
| PVP/PVAc E-335 (50% in ethanol) | 74 | 0.30 |
| NaOH (30% in water) | 36 | 0.27 |
| Deionized water | 37 (added to warm E-335 solution) | |

The reaction products presented in Examples 1-3 can be further purified by treatment with a suitable ion exchange resin to remove base residues as described in U.S. Pat. No. 5,425,879, the disclosure of which is hereby incorporated by reference in its entirety.

Example 4

Synthesis of Acetoacetylated PVP/PVA

The hydrolysis intermediates obtained in Examples 1-3 can be acetoacetylated with diketene in acetic acid or other suitable non-aqueous mediums. The acetoacetylation conditions are as described in U.S. Pat. No. 2,536,980, the disclosure of which is hereby incorporated by reference in its entirety. The resulting products of Examples 1-3 are hydrophobic crosslinkable copolymers of acetoacetylated PVP/PVA.

Example 5

Crosslinking of the Intermediate of Example 4

The crosslinking agents useful herein can be selected from known crosslinking agents such as monoaldehyde (e.g., formaldehyde, acetaldehyde, benzaldehyde, etc.), polyisocyanate compounds, polyfunctional epoxies, dialdehyde (glutaraldehyde, glyoxal, succinic dialdehyde, etc), trimethylol melamine, urea-formaldehyde, blocked aldehyde (e.g. Curesan™ 200 by BASF), polyacrolein, boric acid and borate (such as methyl borate, boron trifluoride, boric anhydride, pyroborates, peroxoborates and boranes). Other potential crosslinking agents include N-lactam carboxylates, dicarboxylic acids (maleic acid or oxalic acid), di-isocyanates, divinyl sulphate, and inorganic compounds such as germanic acids and permanates, titanium salts and esters, chromates and vanadates, cupric salts and other Group IB salts.

The crosslinking agents can be added to the solution of PVP/PVA directly, but it is often preferred to coat the solution of the crosslinking agent on top of the PVP/PVA coating to avoid any coating defects. Such crosslinking improves the smudge resistance and stackability of the coating. In addition, ink absorption rates and image quality (e.g., coalescence) are improved with the incorporation of PVP into the PVA backbone. The amount of crosslinking agents used is from 0.1% to 5% preferably based on the weight of PVP/PVA co-polymers.

Example 6

Evaluation of Copolymers of Examples 1-5 as Inkjet Recording Materials

The inkjet formulations can be coated onto a coated paper (200 g) with a Mylar rod to give a coating weight of 5 to 7 g/M$^2$. The coating is dried and a diagnostic chart is printed with an HP Deskjet 970 printer. The quality of the printing is favorable in four categories, i.e., gloss, image quality (IQ), coalescence and smudge test, and, particularly water resistance.

What is claimed:

1. An inkjet recording medium comprising a support and the hydrophobic crosslinkable acetoacetylated lactam/vinyl alcohol copolymer wherein the copolymer is formed by:
    a) polymerizing vinylpyrrolidone and vinyl acetate monomers to produce a poly(vinylpyrrolidone/vinyl acetate) copolymer, wherein the resulting poly(vinylpyrrolidone/vinyl acetate) copolymer is between 30% and 70% vinylpyrrolidone monomers by weight and between 30% and 70% vinyl acetate monomers by weight;
    b) at least partially hydrolyzing the vinyl acetate of the poly(vinylpyrrolidone/vinyl acetate) copolymer to produce a poly(vinylpyrrolidone/vinyl alcohol) copolymer optionally comprising vinyl acetate depending on degree of hydrolyzation; and
    c) in an acetoacetylation step, at least partially acetoacetylating the vinyl alcohol of the poly(vinylpyrrolidone/vinyl alcohol) copolymer with a diketene to obtain the hydrophobic, crosslinkable acetoacetylated lactam/vinyl alcohol copolymer.

2. The inkjet recording medium of claim 1 which has enhanced dye fade stability.

3. The inkjet recording medium of claim 1 wherein the poly(vinylpyrrolidone/vinyl acetate) copolymer comprises from about 50 to 70% by weight vinylpyrrolidone.

4. The inkjet recording medium of claim 3 wherein the poly(vinylpyrrolidone/vinyl acetate) copolymer is 50% by weight vinylpyrrolidone and 50% by weight vinyl acetate.

5. The inkjet recording medium of claim 1 wherein the poly(vinylpyrrolidone/vinyl acetate) copolymer is 70% by weight vinylpyrrolidone and 30% by weight vinyl acetate.

* * * * *